(12) United States Patent
Gauder et al.

(10) Patent No.: US 8,428,753 B2
(45) Date of Patent: Apr. 23, 2013

(54) SYSTEM AND METHOD FOR PLANNING THE OPERATION OF, MONITORING PROCESSES IN, SIMULATING, AND OPTIMIZING A COMBINED POWER GENERATION AND WATER DESALINATION PLANT

(75) Inventors: Markus Gauder, Schwetzingen (DE); Rolf Schmitt, Deidesheim (DE); Stefan Lauxtermann, Porta Westfalica (DE)

(73) Assignee: ABB Technology AG, Zürich (CH)

( * ) Notice: Subject to any disclaimer, the term of this patent is extended or adjusted under 35 U.S.C. 154(b) by 1154 days.

(21) Appl. No.: 11/795,384

(22) PCT Filed: Jan. 20, 2006

(86) PCT No.: PCT/EP2006/000506
§ 371 (c)(1),
(2), (4) Date: Jul. 17, 2007

(87) PCT Pub. No.: WO2006/079483
PCT Pub. Date: Aug. 3, 2006

(65) Prior Publication Data
US 2009/0043406 A1 Feb. 12, 2009

(30) Foreign Application Priority Data
Jan. 28, 2005 (DE) .......................... 10 2005 004 233

(51) Int. Cl.
*G05B 13/04* (2006.01)
*B01D 3/42* (2006.01)
*C02F 103/08* (2006.01)

(52) U.S. Cl.
USPC .............. 700/28; 700/29; 700/30; 700/31; 700/32; 700/270; 700/273; 700/274; 700/286; 700/287; 700/288; 203/10; 203/12; 203/21; 203/27; 60/641.9

(58) Field of Classification Search ............ 700/28–32, 700/51, 266, 270, 271, 273, 274, 286–290, 700/295, 296; 60/641, 641.8, 641.9; 203/10, 203/12–19, 20, 27
See application file for complete search history.

(56) References Cited

U.S. PATENT DOCUMENTS
2002/0077711 A1* 6/2002 Nixon et al. .................... 700/51

FOREIGN PATENT DOCUMENTS
WO    WO 03/038685 A    5/2003

OTHER PUBLICATIONS
Al-Bahri et al., Optimum feed temperatures for seawater reverse osmosis plant operation in an MSF/SWRO hybrid plant, Desalination 138 (2001) pp. 335-339.*

(Continued)

*Primary Examiner* — In Suk Bullock
*Assistant Examiner* — Robert Eom
(74) *Attorney, Agent, or Firm* — Buchanan Ingersoll & Rooney PC

(57) ABSTRACT

The disclosure relates to a system and a method for planning the operation of, monitoring processes in, simulating, and/or optimizing a technical installation comprising several units that can be combined with each other. Said system comprises at least one process planning module, at least one process simulation module, and at least one process optimization module. Components for modeling, simulating, and optimizing the technical installation are stored in said modules. The interrelated modules cooperate with a data management layer via at least one interface, said data management layer making available actual measured and/or historical process data for determining parameters and/or operational data for the modules in order to plan operations as well as simulate and optimize processes. The parameters and/or operational data determined in the modules can be fed to the data management layer for further processing by taking into account the stored components.

19 Claims, 3 Drawing Sheets

OTHER PUBLICATIONS

Figure 1:
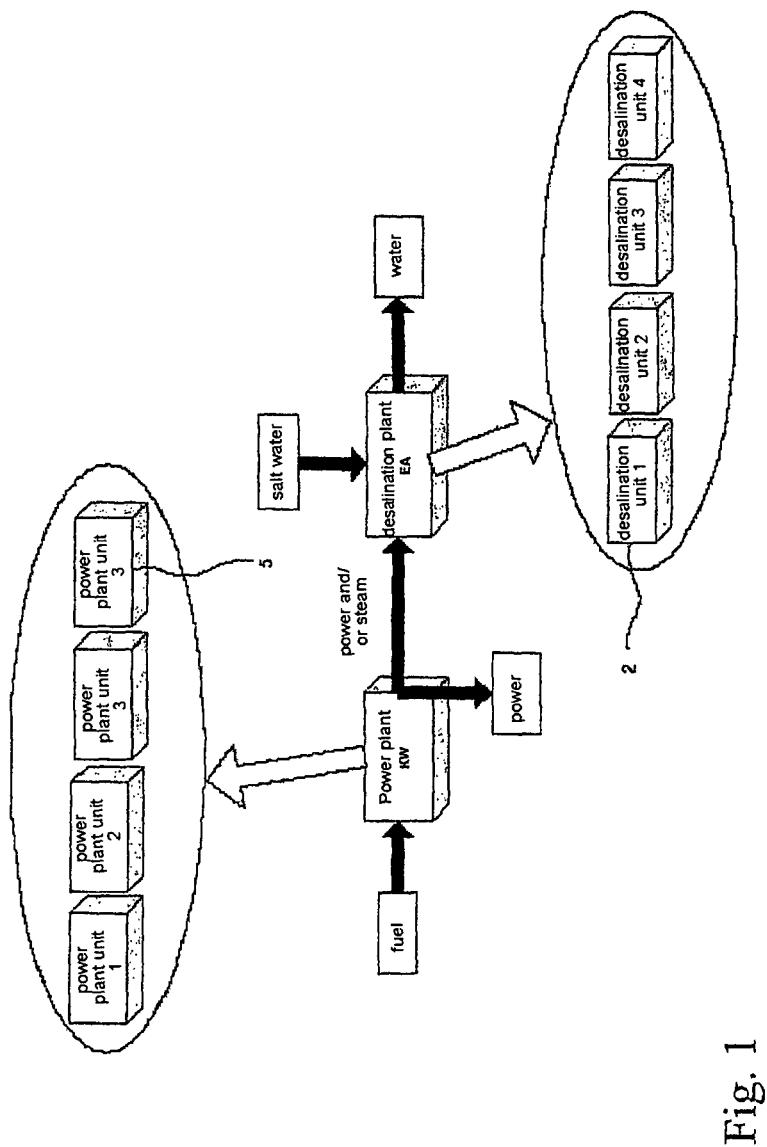

Kraus H. et al: "Improvement of operation and availability of MSF plants" Desalination, Elsevier, Amsterdam, NL, vol. 107, No. 1, Sep. 1996 pp. 59-74, XP004019206 ISSN: 011-9164.

Alatiqi I et al: "Process control in water desalination industry: an overview" Desalination, Elsevier, Amsterdam, NL, vol. 126, No. 1-3, Nov. 1, 1999, pp. 15-32, XP004190178 ISSN: 0011-9164.

Carta J A et al: "Operational analysis of an innovative wind powered reverse osmosis system installed in the Canary Islands" Solar Energy, Pergamon Press. Oxford, GB, vol. 75, No. 2, Aug. 2003, pp. 153-168, XP004465034 ISSN: 0038-092X.

International Search Report.

* cited by examiner

SYSTEM AND METHOD FOR PLANNING THE OPERATION OF, MONITORING PROCESSES IN, SIMULATING, AND OPTIMIZING A COMBINED POWER GENERATION AND WATER DESALINATION PLANT

The invention relates to a system and a method for planning the operation of, monitoring processes in, simulating, and/or optimizing a combined technical installation as claimed in claims 1 and 17, and is particularly suitable for process monitoring, simulation and optimization in combined power generation and water desalination plants.

Water desalination plants typically comprise one or more units, which are combined with power plants or individual power plant units, also referred to below as power generation plant, according to the construction of the plant. For example, waste steam from the power plants or the power plant units is used for thermal water desalination to desalinate sea water or salt water.

The heating or combination power plants for power generation produce the steam and/or power required for water desalination, according to which desalination process technology is currently being used, which includes both thermal and membrane-based water desalination processes.

Thermal process technologies for water desalination include, for example, multi-stage flash (MSF), multi-effect distillation (MED) and thermal vapor compression (TVC).

Membrane-based desalination processes include, for example, reverse osmosis (RO), nano-filtration (NO) and ultra-filtration (UF).

Oil-fired plus gas-fired and coal-fired power stations are used for generating power.

In order to reduce investment costs and operating costs, the water desalination units are coupled to the power generation units in such a way that the waste steam produced from the power plant can be used for desalination. The supply of power required by the desalination plants can be provided by connecting the plant to a power grid or by a direct connection to the power plant.

Simulation and optimization for operation planning and process management in combined power generation and water desalination plants involves the following aspects:
- changed load requirements for the power generation plant and/or the water desalination plant,
- switching between full load and partial load for power generation,
- creating new operating schedules as a result of the failure of a power generation plant and/or water desalination plant,
- creating new operating schedules as a result of repairing a power generation plant and/or water desalination plant,
- changing the production target,
- creating cost-optimized operating plans for the short term,
- creating cost-optimized operating plans for the medium term,
- creating cost-optimized operating plans for the long term, for example when plant expansions are scheduled,
- optimizing the water mixing process where a range of water desalination process technologies are employed,
- optimizing the number of start-up and shutdown operations of the power generation and water desalination plants,
- optimizing the storage of the desalinated water produced,
- optimizing the operating point by means of process optimization in the event of deteriorations in the power generation plant and/or water desalination plant or changed ambient conditions, and
- analyzing the effect of various operating situations on the production target by means of simulation.

Known simulation and optimization methods are here performed separately for the power generation and water desalination plants, but not in combination for coupled power generation and sea-water desalination plants, and without making use of synergies and opportunities for the combined application.

Parameters such as production costs or production volumes are calculated separately either for the power generation plant or the water desalination plant, but not for the complete technical installation, so that analysis of the operation of a combined installation is only possible by time-consuming manual integration of a plurality of performance parameters.

The simulation and optimization methods currently used do not provide adequate simulation and optimization solutions for combined plants to perform tasks required by the plant operator that include calculating operating costs, computing parameters, determining optimum operating points or designing plants.

Investment costs and operating costs can be reduced by optimizing the plant design and construction. New or redeveloped materials and chemicals used to prevent foaming or films forming are essential for exploiting the full operating limits of plants. These optimizations essentially relate to the plant planning phase. Appropriate simulation and optimization solutions are required for optimization of plant operation, which becomes necessary, for example, when performances deteriorate or when there are changes in ambient conditions such as the temperature of the water to be desalinated, in order to satisfy the specified requirements.

Starting from the prior art, the object of the invention is to define a system and a method for planning the operation of, monitoring processes in, simulating and/or optimizing a combined technical installation, in particular a combined installation of power generation and water desalination plants, which overcome the aforementioned disadvantages of the prior art, and by means of which the plant operating mode, which is constrained by the dependence of the water desalination plants on the supply of steam and power from the power generation plants or boilers for steam generation, can be adapted to a change in the plant situation so that optimum operation of the plant is restored in the new situation.

This object is achieved according to the invention by a system of the type cited in the introduction having the features given in claim 1. Advantageous embodiments, improvements in the system according to the invention and a method are given in further claims and in the description.

According to the invention, the system for planning the operation of, monitoring processes in, simulating and/or optimizing a technical installation comprising a plurality of units that can be combined with each other, in particular a combined installation of power generation and water desalination plants, comprises at least one operation planning module, at least one process simulation module and at least one process optimization module.

In one embodiment of the system according to the invention, the process simulation module comprises relevant optimization options for process optimization, thereby making an additional process optimization module unnecessary.

Components for modeling, simulating and optimizing the technical installation are stored in the operation planning, process simulation and process optimization modules, where the models of the technical installation can be adapted to specific requirements of the technical installation, and the components are designed differently according to the requirements of operation planning, simulation and process optimization. The essential differences lie in the models used as the basis for the components.

Suitable models such as physical and mathematical descriptions are used as the basis for the components required for modeling. A model of an installation is created graphically, for example, by linking various components, thereby automatically modeling the physical-mathematical relationships inside the modeled installation. Examples of components for generating power are pumps, a turbine or a boiler. Components from the field of water desalination are the water desalination units, reservoirs for temporary storage of desalinated water, or pumps, for example. Depending on the respective model underlying the component, time-limited storage, for example over a period of 24 hours, can also be taken into account.

In addition to water storage, a water mixing component also plays an essential role in the case of operation planning. Since different water qualities and quantities are produced by the various process technologies (for instance water obtained by multi-stage flash is far purer than water from the reverse osmosis process), the system according to the invention allows the mixing capability of the water to be simulated and optimized by the operation planning of the plants. The requirements needed for this are covered by the operation planning module.

If, for example, operation planning is carried out for hybrid installations in which two or more different process technologies for water desalination are used in an installation, the desalinated water produced has a varying quality as regards salt content. Since preset quality standards need to be met, however, a water mixing component defining the water quality limits needs to be used. To avoid going above or below the defined limits, operation planning includes a water mixing component to operate units of the installation of power generation and water desalination plants in accordance with the preset limits, and hence enabling water to be produced whose quality lies within the defined limits.

The operation planning module is configured, for example, to calculate optimized operating schedules for the individual units and/or the whole technical installation, which are then used as the basis for operating the plant. It contains all necessary components, including the model required for the combined operation planning of the power generation and/or water desalination plant.

The process simulation and process optimization modules are used, for example, to calculate optimum operating-point settings for characteristic operating values of the respective units and/or the whole technical installation, or to simulate the effect of one or more process parameters on the production result, for example.

Process optimization is used to optimize the operating points of relevant characteristic operating values of various units, also referred to below as plant sections, for instance the "top brine temperature (TBT)" or the amount of distillate produced (thermal water desalination), so that power generation and water desalination are operated at an optimum level in accordance with a defined optimization target. The optimization targets of process optimization can be defined flexibly here.

The system according to the invention takes into account all aspects relevant to process optimization of the combined technical installation, such as cost factors, environmental constraints, contractual conditions such as fuel supply contracts or a contractually guaranteed quantity of water to be supplied, and operational aspects such as the availability of plant units. Optimum and efficient operation of the plant is possible by integrating the optimizations for power generation and water desalination plants and applying the various optimization solutions of the individual plant sections. Changes in the plant situation are taken account of by the comprehensive simulation and optimization of the plant operating mode.

Simulation by the process simulation module is used to investigate the effect produced by a change in influential parameters on the behavior of the whole installation. For example, it is possible to simulate what impact a change in the heat transfer coefficients has on the production of desalinated water.

Libraries containing components used for configuring different installations are stored in the operation planning, process optimization and process simulation modules, where any additions and/or changes can be made to the libraries.

The interlinked operation planning, process simulation and process optimization modules interact via at least one interface with a data management layer, which provides the operation planning, process simulation and optimization modules with real-time and historical process data, transfers this process data to the modules and supplies the results of the data management layer calculated in the modules for further processing.

The calculated parameters and/or operating values characterize the respective units and/or combinations of the units, which are preferably water desalination units and power plant units. The parameters and operating values, which include both parameters specific to power generation plants and desalination plants and a combination of these parameters, are calculated on the basis of the real-time process data, and are visualized, archived and/or documented by means of available visualization and documentation modules, also referred to below as display modules. If applicable, historical data is also used for simulation and optimization. In addition, the simulation and optimization modules are also provided with data such as new load requirements.

The calculated parameters and operating values also incorporate modified load requirements for the units of the technical installation, new operating schedules caused by the failure and/or repair of units of the technical installation, changes in a production target and/or new operating plans.

The system according to the invention is particularly suited to operation planning, process monitoring, simulation and/or optimization in combined installations of gas-fired, oil-fired or coal-fired power generation plants and thermal or membrane-based water desalination plants.

In an advantageous embodiment of the invention, it is provided that characteristic performance parameters, which can be used for constant monitoring of operation and for subsequent documentation and analysis, are calculated by a process monitoring module that interacts with the data management layer. The performance parameters are calculated either in the data management layer or in the process monitoring module connected to the data management layer. The performance parameters, which include not only parameters specific to power generation plants and desalination plants but also combined parameters, are calculated on the basis of real-time process data provided via the data management layer, and visualized and documented via the available visualization and documentation modules. Monitoring of performance parameters can also be used for determining in real-time, predefined parameters important to the operation of the technical installation.

In a preferred embodiment of the invention, analysis functions are provided in the data management layer or the process monitoring module that perform an analysis of plant operation using the combined, calculated characteristic performance parameters. If the installation deviates from its optimum operating level, it is then possible to generate an alarm that indicates this change. As a result, an optimization can be carried out so that the installation is returned to an optimum operating range within preset limits. Optimization can be started automatically in the event of an alarm occurring, or manually by the operator.

In a further advantageous embodiment of the invention, it is provided that the data management layer interacts with a forecasting module for predicting, amongst other parameters, consumption values for power, heat and water. For example, the forecasting module is provided for producing relevant forecasts of the power, heat and/or water consumption. This consumption data is used to produce load profiles required for operation planning. The forecasting module obtains some of the required data as real-time consumption and/or status data for the technical installation via the data management layer. Additional data such as the weather forecast is provided from other systems such as the Internet. After a forecast has been made by the forecasting module, the calculated data is written back to the data management layer and is thus available via the aforementioned interfaces for further processing by the operation-planning optimization module.

The interfaces between the data management layer and the modules, and the interfaces to the process, for example to a process control system, are implemented as standard interfaces or proprietary interfaces.

The system according to the invention is further provided to activate, on an event-driven, periodic and/or manual basis, calculation of the parameters and operating values in the data management layer and/or in the modules for operation planning, optimization, simulation and process monitoring of the technical installation, which are connected to the data management layer.

Combining the water desalination plant with the power plant offers potential optimization of investment costs and operating costs in particular. Investment costs are optimized by using the shared infrastructure during the planning phase, whilst for operating costs, alongside the use of new types of materials or chemicals, there is the opportunity to use an online simulation and optimization solution for the combined installation.

By integrating the components of the technical installation in the operation planning, process simulation and process optimization modules, and hence extending simulation and optimization to provide overlapping optimization functions, the market requirements for operation planning, process monitoring, simulation and/or optimization of the combined installations of power generation and water desalination plants are advantageously covered, and the facility provided to simulate and define flexibly the optimization targets.

Integrating real-time and historical process data in the data management layer advantageously enables performance parameters to be calculated for the whole combined installation, thereby enabling another fundamental market requirement to be met. Decision-making relating to the combined operation of the plant is also supported.

The method, which is also used to achieve the object, is given in claim 17. In this method, components for modeling, simulating and optimizing the technical installation are stored in at least one operation planning module, at least one process simulation module and at least one process optimization module, and real-time and historical process data for calculating parameters for the operation planning, process simulation and optimization modules is provided by a data management layer interacting with the modules via at least one interface. If the process simulation module is equipped with suitable optimization facilities, an additional process optimization module is not required.

The parameters and operating values calculated in the modules, taking into account the stored components, are supplied to the data management layer for further processing.

There are two different versions of implementing the method according to the invention for operation planning, process monitoring, simulation and/or optimization.

In the first implementation version, operation planning and process simulation and optimization are performed separately from each other in the respective modules. The parameters and operating values calculated in the modules are saved in the data management layer and stored for further processing. Only the input data required for calculating the respective parameters and operating values, for instance data such as measured values, constants, statistical series etc., and the calculated results are transferred between the data management layer and the modules.

In another implementation version, the calculated parameters and operating values of operation planning are used directly to calculate the parameters and operating values of the process simulation and optimization, and vice versa. In this case, the data management layer acts as data carrier and data storage device.

The system and method according to the invention for operation planning, process monitoring, process simulation and/or optimization in combined installations of gas-fired, oil-fired or coal-fired power generation plants and thermal or membrane-based water desalination plants provides an efficient and optimum facility for simulating, optimizing and monitoring the operation of combined power generation and water desalination plants.

The system and method according to the invention are preferably used for operating-point optimization in the event of deteriorations in the power generation plant and/or water desalination plant or changed ambient conditions, for optimizing a water mixing process where a range of water desalination process technologies are employed, for optimizing the number of start-up and shutdown operations of the power generation and water desalination plants, and/or for optimizing the storage of desalinated water produced.

Figure 2:
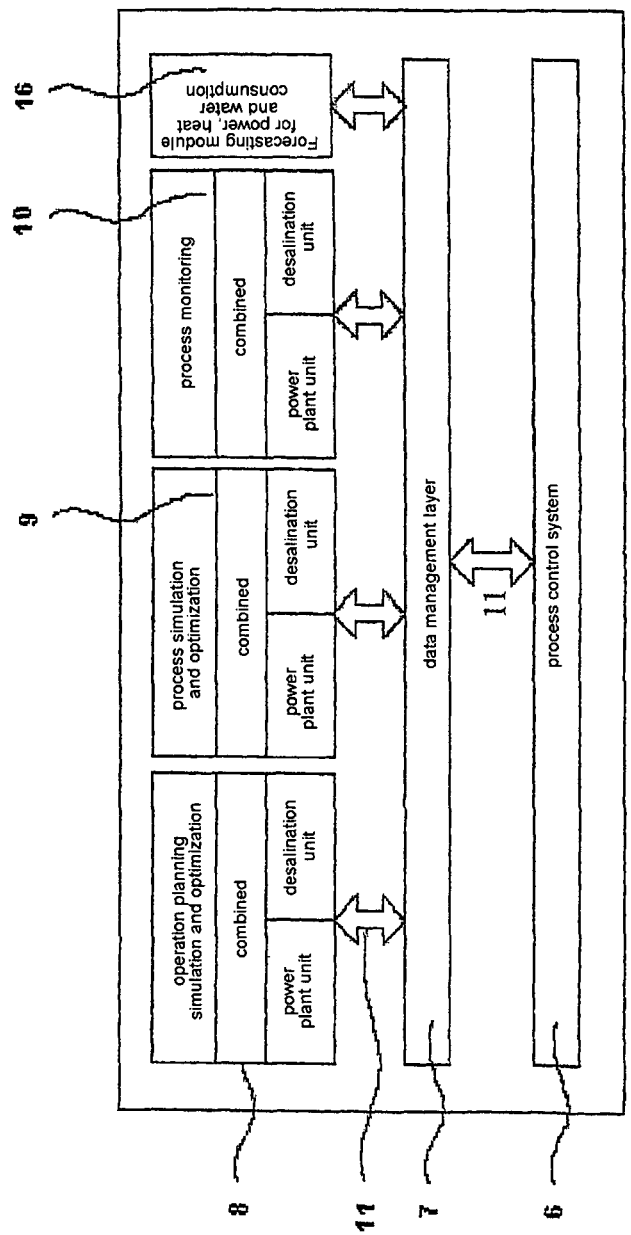
Figure 3:
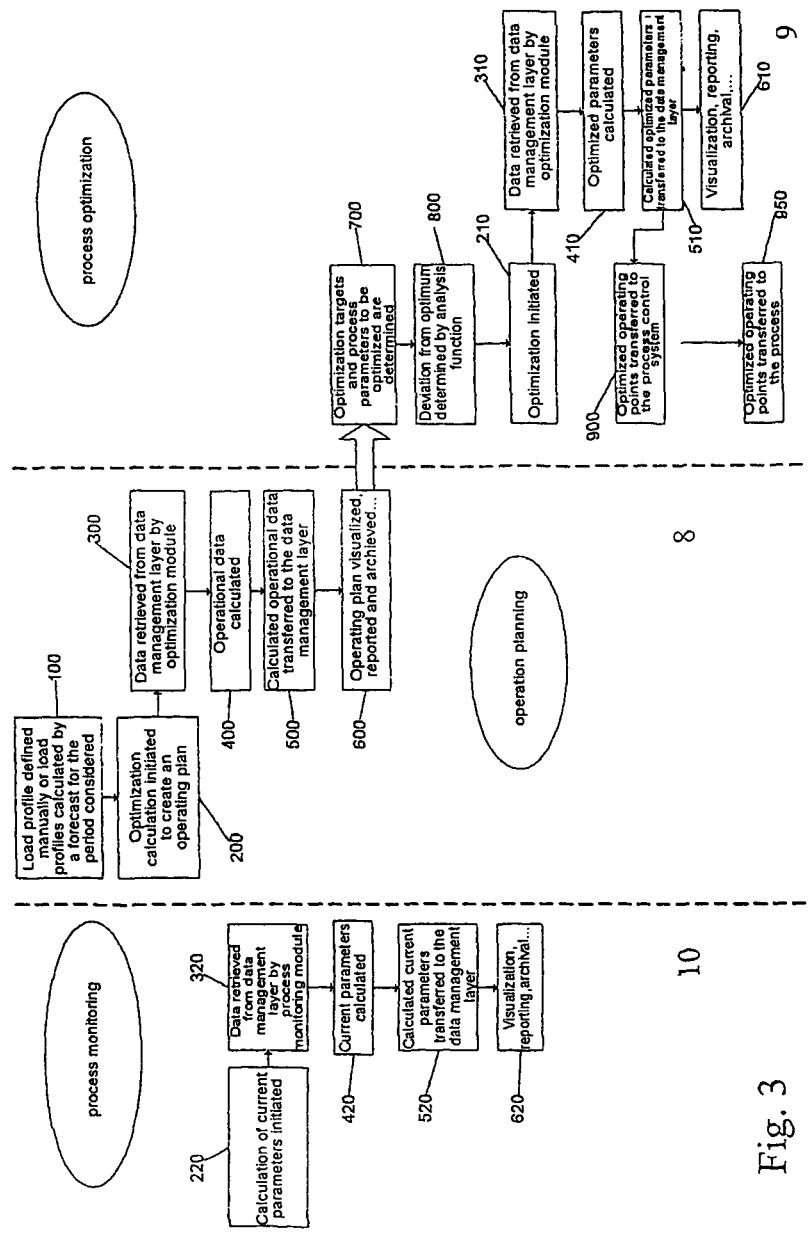

The invention plus advantageous embodiments, improvements and other advantages of the invention shall be explained and described in greater detail with reference to the exemplary embodiment shown in the following figures, in which FIG. 1 shows an embodiment of a combined installation of power generation and water desalination plants, FIG. 2 shows an embodiment of the system according to the invention for planning the operation of, monitoring processes in, simulating, and optimizing a combined power generation and water desalination plant, and FIG. 3 shows an example of a method sequence running automatically, which illustrates an embodiment of the system according to the invention.

FIG. 1 shows an embodiment of a combined installation of power generation and water desalination plants comprising a power plant KW for generating power and/or steam from fuel, and a desalination plant EA, in which sea water or salt water is desalinated.

The water desalination plant comprises a plurality of desalination units 2, which are combined with the power plant or individual power plant units 5 according to the construction of the plant. Waste steam from the power plant KW or the power plant units 5 is used for thermal water desalination to desalinate the sea water or salt water. Connecting the water desalination plant to the power plant 3 offers potential optimization of investment costs and operating costs. Investment costs are optimized by using a shared infrastructure and offline simulations of operating scenarios during the planning phase, whilst in the case of operating costs, there is the opportunity to use an online simulation and optimization solution for the combined plant.

The simulation and optimization functions for the combined installation of power generation and water desalination plant shown in FIG. 1, also referred to as a coupled installation, comprise for operation planning and process management for example:

- changed load requirements for the power generation plant and/or the water desalination plant, which may vary depending on the time of day, the week, the month or the year,
- switching between full load and partial load for power generation,
- creating new operating schedules as a result of failure of the power generation plant and/or water desalination plant,
- creating new operating schedules as a result of repairing the power generation plant and/or water desalination plant,
- changing the production target, for example by switching from summer to winter operation by switching the "power" production target to the "water" production target for instance,
- creating operating plans for the short term, for example creating a plant operating plan for the next day,
- creating operating plans for the medium term, for example to renegotiate fuel supplies,
- creating operating plans for the long term where plant expansions are scheduled,
- optimizing the operating point by means of process optimization in the event of deteriorations in the power generation plant and/or water desalination plant or changed ambient conditions such as the sea water temperature,
- optimizing the water mixing process where a range of water desalination process technologies are employed,
- optimizing the number of start-up and shutdown operations of the power generation and water desalination plants, and
- optimizing the storage of the desalinated water produced.

The system shown in FIG. 2 for planning the operation of, monitoring processes in, simulating, and optimizing the combined installation of power generation and water desalination plants can be used to perform, in combination, the optimization and simulation functions for the coupled power generation and sea-water desalination plant of FIG. 1.

The system according to the invention comprises an operation planning module 8 for the area of simulation/optimization and a process optimization/simulation module 9. Combining these modules 8, 9 allows the given requirements regarding simulation and optimization to be covered. The operation planning 8 and process optimization/simulation modules 8, 9 contain the relevant components, including the necessary models, such as the process models for modeling the installation, which are required for combined simulation and optimization of the coupled water desalination units 2 with the power plant units 5.

The relevant components for modeling, simulating and optimizing the technical installation are stored in the models, where the models can be adapted to specific requirements of the technical installation at any time. The components are designed to take different forms according to the requirements of operation planning, simulation and process optimization. For example, detailed mathematical equations for mass and energy balances and cost functions underlie the components for process simulation and optimization, but these are not needed for the operation planning components in this form.

If as an alternative, separate boilers for generating the required steam are used to avert a breakdown, i.e. to ensure operation of the water desalination plant, the relevant components for modeling the separate boiler are also present in the operation planning, simulation and process optimization modules 8, 9.

The interlinked operation planning, process simulation and process optimization modules 8, 9 interact via interfaces 11 with a data management layer 7, which is preferably implemented as a plant information management system (PIMS).

The data management layer 7 provides the operation planning, process simulation and optimization modules 8, 9 with real-time and historical process data for calculating parameters and operating values such as production costs or optimized operating points, and transfers the process data to modules 8, 9. The modules 8, 9, taking into account the components stored in the units 2, 5, calculate from the real-time and historical process data, by means of process optimization and simulation, parameters and operating values for the coupled power generation and sea-water desalination plant.

The parameters and operating values calculated in the modules 8, 9 are supplied via the interfaces 11 to the data management layer 7 for further processing. For this purpose, the data management layer 7 is connected to the process, for example a process control system 6. The data management layer 7 is interfaced to the process control system 6 via standard interfaces or via proprietary interfaces.

The system according to the invention comprises different functions for visualization, data archival, reporting and for evaluating and analyzing the calculated parameters and operating values, depending on the information system selected, which represents the data management layer 7.

The system according to the invention is advantageously designed so that replacing, modifying or removing at least one of the modules 8, 9 can be carried out without affecting the other modules and hence the overall configuration.

In addition to the real-time and historical process data, the information required for simulation and optimization preferably also includes the results from the other respective optimization, i.e. process simulation and optimization accesses the current results from operation planning, and vice versa, so that integrated optimization is taking place here.

The system according to the invention additionally comprises a process monitoring module 10, which interacts with the data management layer 7 and calculates characteristic performance parameters, such as efficiency levels or production quantities of individual units, which can be used for constant monitoring of operation and subsequent documentation and analysis. The performance parameters are calculated either in the data management layer 7 or in the process monitoring module 10 connected to the data management layer 7. The parameters, which include both parameters specific to power generation plants and desalination plants and also combined parameters such as production costs, are calculated on the basis of real-time process data provided via the data management layer 7, and are visualized and documented by means of the available visualization and documentation functions.

The system according to the invention supports a further option, which provides the operation planning modules 8 and the process optimization and simulation module 9 with forecasted consumption data as a basis for the optimization functions.

The system according to the invention comprises for this purpose a forecasting module 16, which produces relevant forecasts for power, heat and water consumption. The forecasting module 16 obtains some of the data required for this as real-time consumption and status data for the installation plus historical data, from the data management layer 7. Another part of the data is provided by other systems, such as a weather forecasting system. After the forecast has been made, the calculated data is written back to the data management layer 7 and is thus available to the optimization modules via the aforementioned interfaces 11.

FIG. 3 shows an example of a method sequence running automatically, which illustrates an embodiment of the system according to the invention.

The operation planning module 8, which comprises components for modeling, simulating and optimizing the combined power generation and water desalination plant, is provided in a first step 100 with a load profile as the basis for the optimization tasks to be performed. The load profile can be predefined or calculated using a forecasting module 16. If the load profile is calculated, the data used includes historical consumption data and weather data.

In a second step 200, the optimization process for creating an operating plan is initiated.

In a third step 300, the real-time and/or historical process data is retrieved from the data management layer 7, and in a fourth step 400, the operational data for the operating plan is calculated, taking into account the stored components.

The calculated operational data is transferred in a fifth step 500 to the data management layer 7, and is thus available as an operating plan for process optimization. In addition, the operating plan can be visualized, archived and documented in a step 600 by means of a visualization and documentation module.

Once the optimization target and the process parameters to be optimized have been determined from the operating plan in a seventh step 700, the deviation from the optimum is calculated by a setpoint/actual value comparison of the calculated parameters and operating values in an analysis in an eighth step 800, and optimization of the process is initiated by the process optimization module 9 in a ninth step 210. The parameters calculated by the process monitoring module 10 during process monitoring, which is shown on the left in FIG. 3, are used to determine the deviation from the optimum.

Process monitoring runs in parallel with operation planning 8 and process optimization 9, where process monitoring is initiated automatically or manually in a tenth step 220. In an eleventh step 320, the process monitoring module 10 retrieves the required real-time and historical process data from the data management layer, in a twelfth step 420 calculates the current parameters, and in a thirteenth step 520 writes the calculated parameters back to the data management layer 7. The data management layer 7 provides the calculated parameters for analysis. The parameters are also available for visualization, archival, documentation and monitoring by means of visualization and documentation module 620.

To calculate the optimized parameters and operating values for optimizing the process, in a further step 310, the process optimization module 9 retrieves from the data management layer 7 the real-time and/or historical process data and/or calculated parameters from the process monitoring module 10 that are required for optimizing the plant. In a subsequent step 410, the parameters and operating values for optimizing the plant process are calculated, which are in turn transferred into the data management layer 7 in a subsequent step 510, and provided as optimized operating points to the process 950 via the process control system of the plant 900.

The optimized operating points are transferred to the process automatically. Alternatively, the optimized operating points can also be transferred manually. In the case of automatic transfer, the optimized operating points are transferred directly without the plant operator needing to intervene. In the case of manual transfer, the optimized operating points are not transferred to the process 950 until the operator has confirmed the transfer operation.

In addition, in a final step 610, the calculated, optimized parameters and operating values of the process are visualized, archived and documented by means of visualization, archival and documentation functions provided by the data management layer 7.

Efficiency levels of the plants or plant components are among the factors that are optimized by process optimization performed according to the invention. This feeds back to optimization of operation, because, for example, one plant section is now operated at a better efficiency level than was originally planned.

The invention claimed is:

1. A system for planning the operation of, monitoring processes in, simulating, and/or optimizing a combined technical installation of power generation and water desalination plants, wherein the combined technical installation comprises:
   a power plant or individual power plant units;
   a plurality of sets of water desalination units, each set being associated with a respective desalination technology that produces a corresponding water quality and water quantity, wherein the sets receive a process flow from at least one of the power plant units; and
   a water mixing component connected to receive a process flow from each set of water desalination units;
   the system comprising:
   a process control system for providing optimized operating points to the combined technical installation; and
   a processing device configured with program code to generate:
   at least one operation planning module, at least one process simulation module and at least one process optimization module, where components for modeling, simulating and optimizing the technical installation are stored in the modules;
   a data management layer which is connected to provide the at least one operation planning module, the at least one process simulation module, and the at least one optimization module with real-time and historical process data from the process control system via at least one interface,
   wherein the modules are configured to calculate at least one of performance parameters and operating values using at least one of the real-time and historical process data provided via the data management layer and the stored components and to transfer at least one of the performance parameters and operating values as optimized operating points to the process control system via the data management layer, wherein the performance parameters include parameters specific to power generation plants, desalination plants, and a combination of those parameters, and
   wherein the at least one operation planning module is configured to calculate an optimized operating schedule for at least one of the units of the technical installation based on at least water quality limits associated with the water mixing component.

2. The system as claimed in claim 1, wherein the at least one operation planning module calculates operating schedules for at least one of the units of the technical installation and/or for the whole technical installation.

3. The system as claimed in claim 1, wherein the at least one process simulation and the at least one optimization module calculate optimum operating-point settings for characteristic operating values of at least one of the units of the technical installation and/or for the whole technical installation.

4. The system as claimed in claim 1, wherein libraries containing components for modeling different installation configurations are stored in the at least one operation planning module, the at least one the process simulation, and the at least one optimization module.

5. The system as claimed in claim 4, wherein each of the at least one operation planning module, the at least one process simulation, and the at least one optimization module is configured to receive at least one of additions and changes to the respective libraries.

6. The system as claimed in claim 1, wherein the data management layer interacts with a process monitoring module for calculating performance parameters during operation of the technical installation.

7. The system as claimed in claim 1, wherein the data management layer interacts with a forecasting module for predicting process data.

8. The system as claimed in claim 1, wherein the modules are connected to the data management layer via standard interfaces or proprietary interfaces.

9. The system according to claim 1, wherein at least one of the data management layer and the modules connected to the data management layer calculate at least one of the parameters and operating values for operation planning, optimization, simulation and process monitoring of the technical installation.

10. The system according to claim 1, wherein at least one of the parameters and operating values calculated in the modules characterize at least one of the respective units and combinations of the units.

11. The system as claimed in claim 1, wherein at least one of the modules is configured to calculate at least one of the parameters and operating values on at least one of an event-driven, periodic and manual basis.

12. The system as claimed in claim 1, wherein at least one of the modules is configured to calculate at least one of the parameters and operating values based on at least one of changed load requirements for the units of the technical installation, the failure of units of the technical installation, the repair of units of the technical installation, and changes in a production target.

13. The system as claimed in claim 1, wherein the data management layer provides at least one of real-time and historical process data for calculating the performance parameters.

14. The system as claimed in claim 1, wherein the data management layer transfers at least one of the real-time process data for calculating at least one of the parameters and operating values into the modules, and historical process data for calculating at least one of the parameters and operating values into the modules, and at least one of the parameters and operating values calculated in the modules can be supplied to the data management layer for further processing.

15. The system as claimed in claim 1, wherein at least one display module is configured to visualize, archive, and document at least one of the calculated parameters and/or operating values.

16. The system as claimed in claim 1, wherein the data management layer or the process monitoring module is provided for analyzing at least one of the parameters and operating values.

17. A combined power generation and water desalination plants comprising a system according to claim 1.

18. The combined power generation and water desalination plants according to claim 17, wherein the system is configured for operating-point optimization in the event of deteriorations in at least one of the power generation plant and water desalination plant or changed ambient conditions, for optimizing a water mixing process where a range of water desalination process technologies are employed, for at least one of optimizing the number of start-up and shutdown operations of the power generation and water desalination plants, and for optimizing the storage of desalinated water produced.

19. The system as claimed in claim 1, wherein the data management layer interacts with a forecasting module for generating a load profile for the combined power generation and water desalination plant based on any combination of real time consumption data, status data, historical consumption data, and weather data, and providing the generated load profile to the data management layer for access by the at least one operation planning module.

* * * * *